Aug. 5, 1958 L. H. KNIBB 2,845,658
COLLAPSIBLE MANDREL FOR USE IN FABRICATING PLASTIC PIPE
Filed Jan. 28, 1954 4 Sheets-Sheet 2
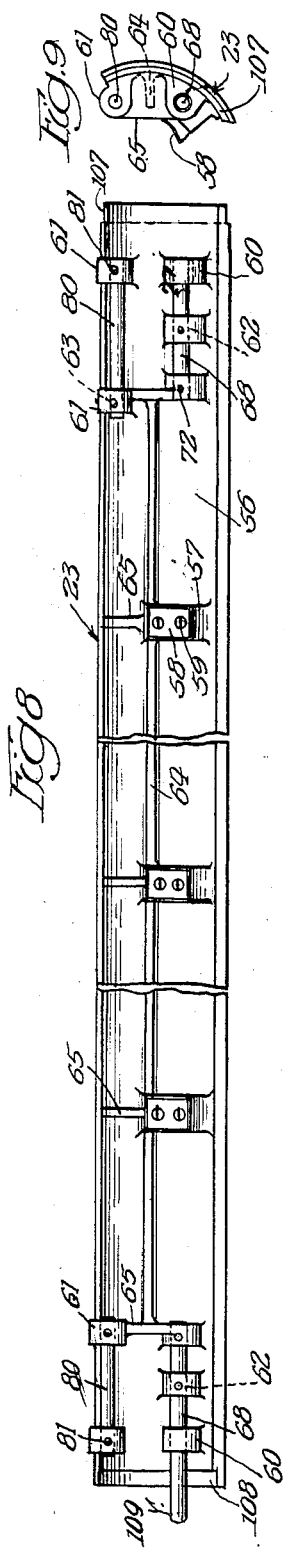
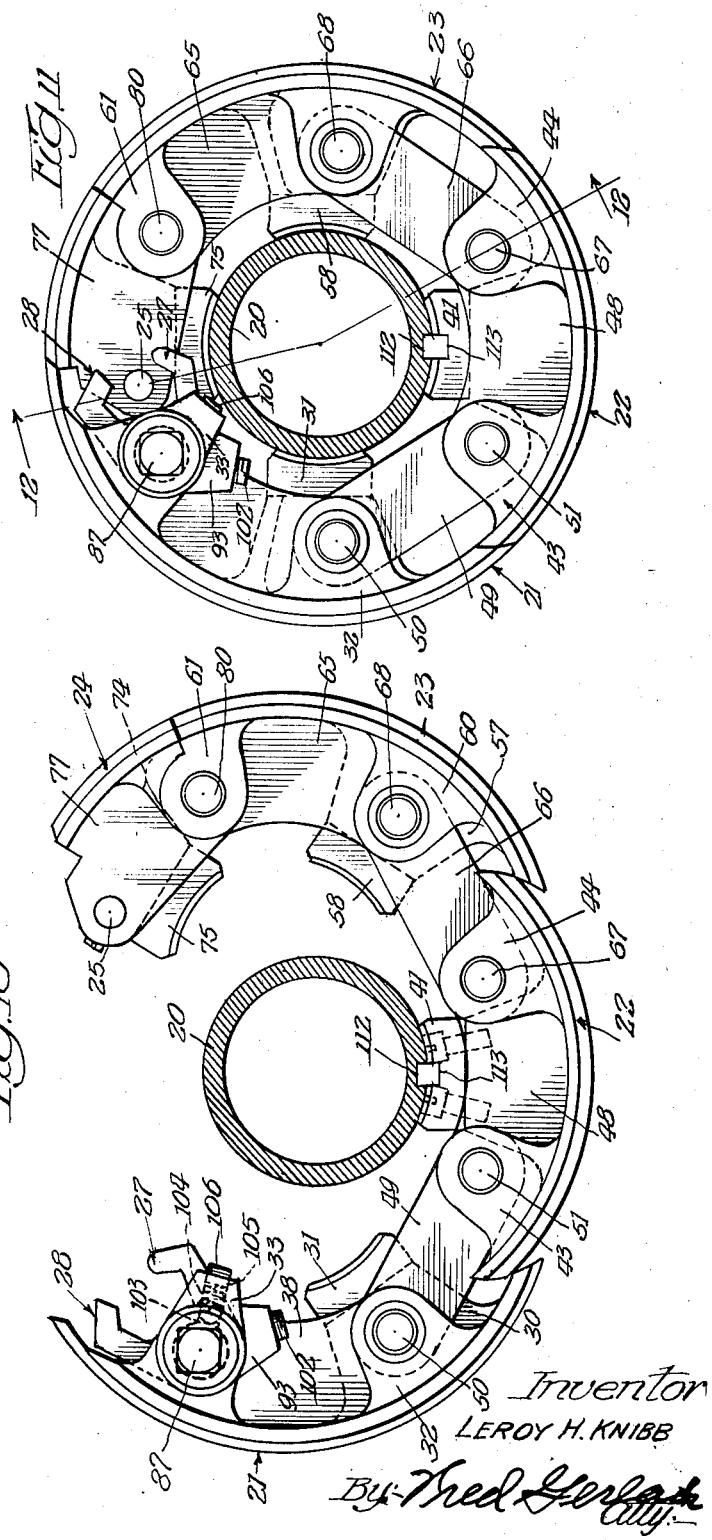
Inventor
LEROY H. KNIBB
By Fred Gerlach
Atty.

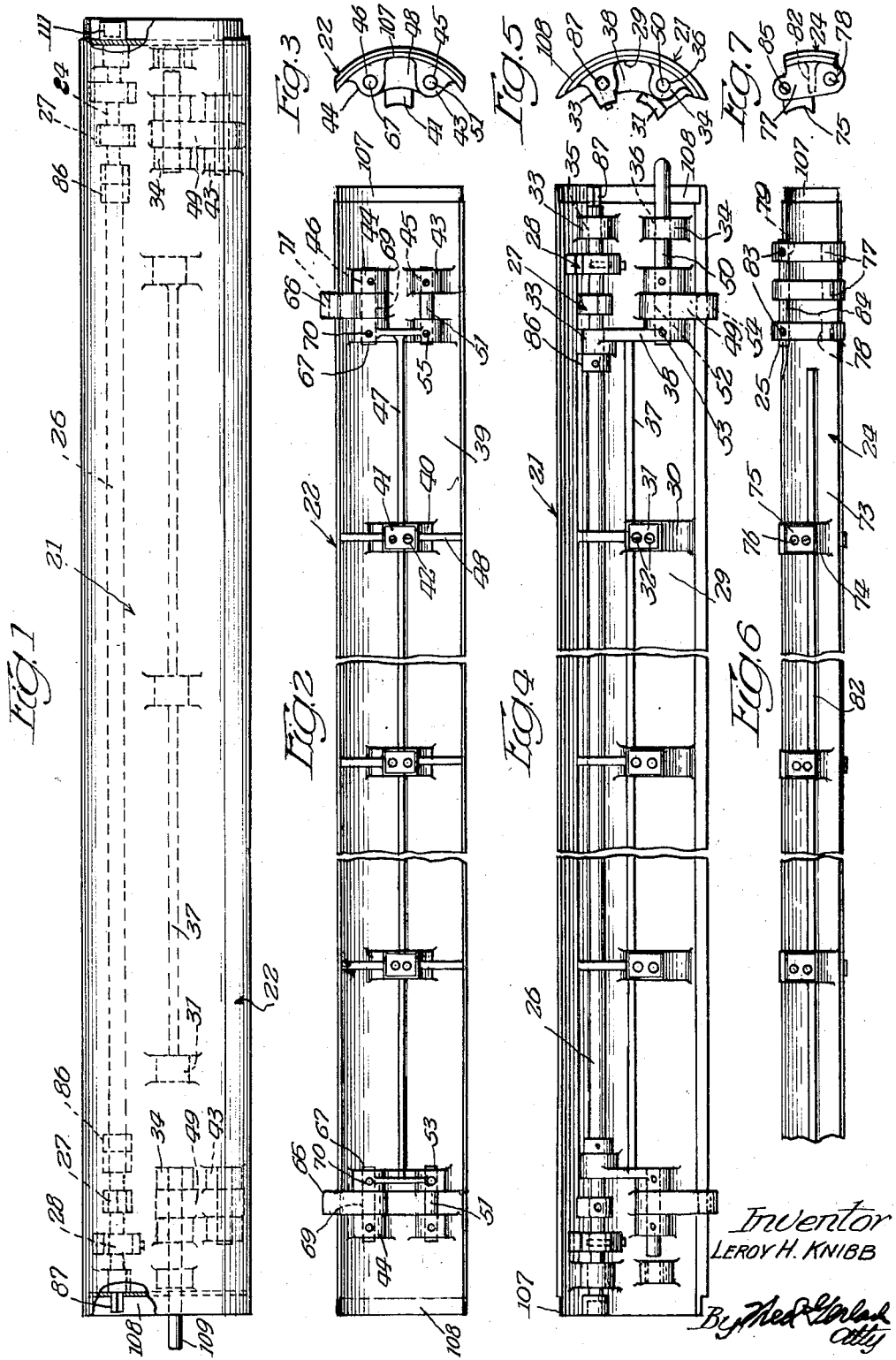

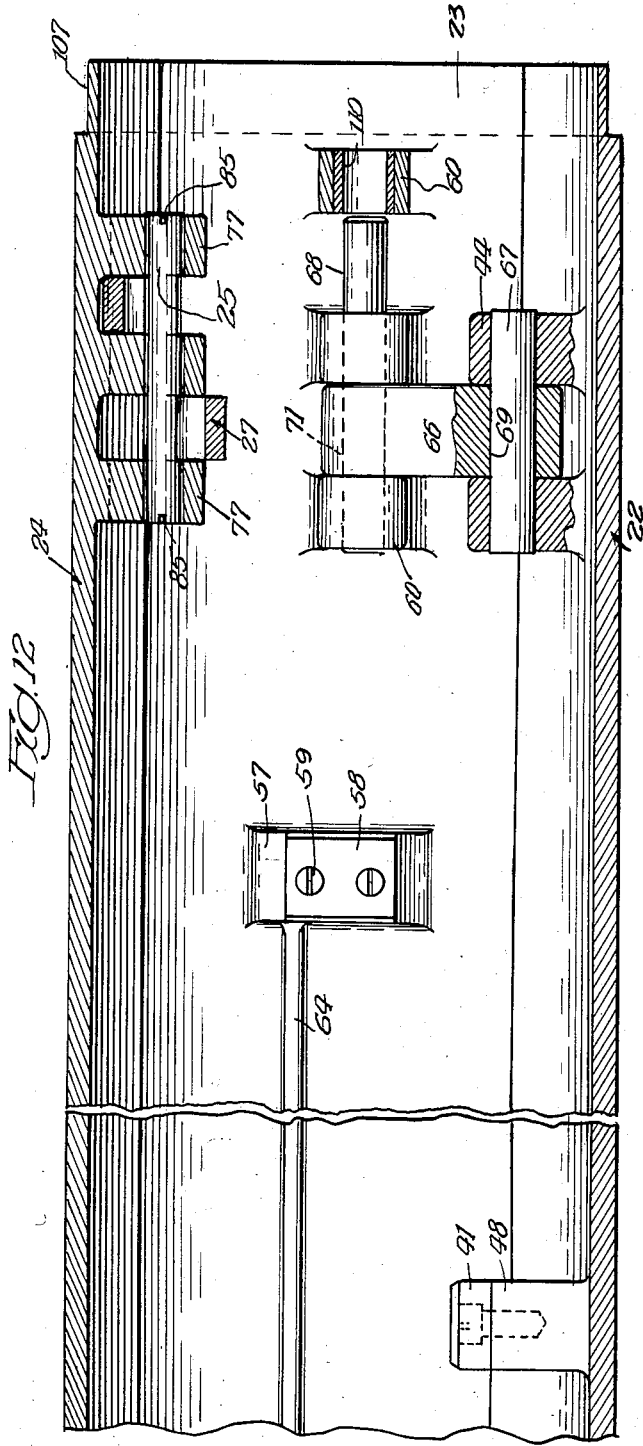
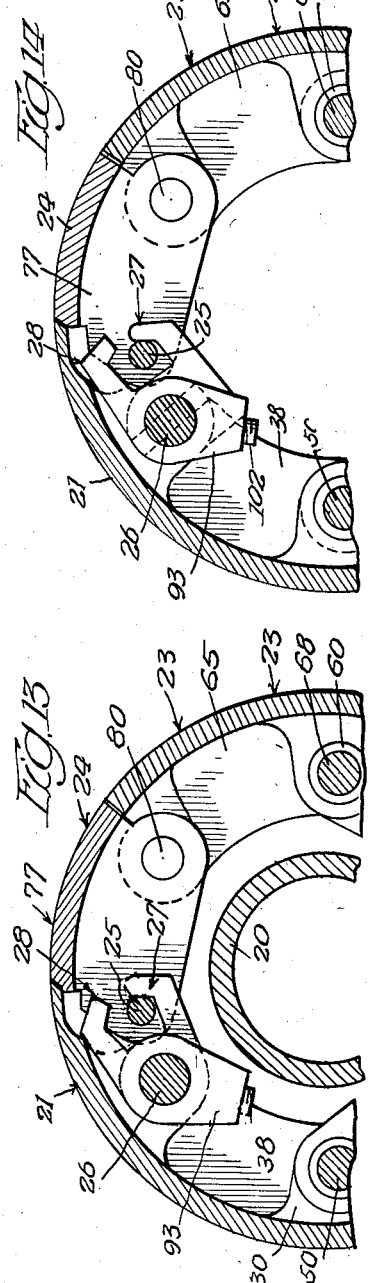

Aug. 5, 1958 — L. H. KNIBB — 2,845,658
COLLAPSIBLE MANDREL FOR USE IN FABRICATING PLASTIC PIPE
Filed Jan. 28, 1954 — 4 Sheets-Sheet 4
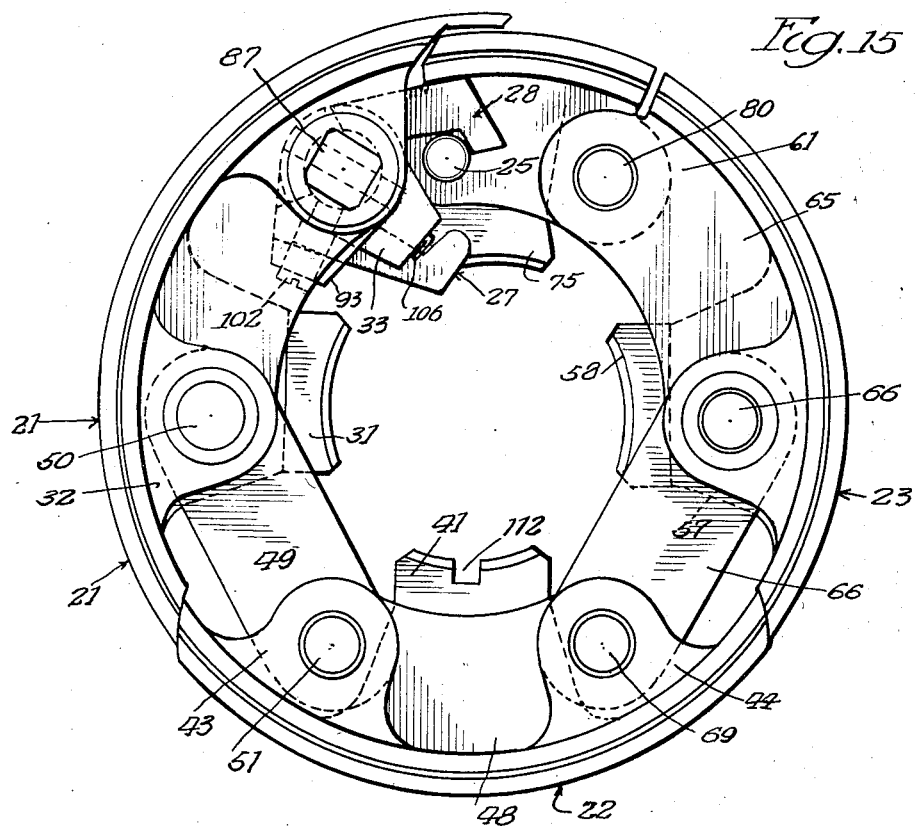
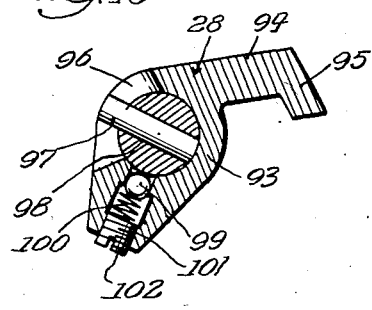
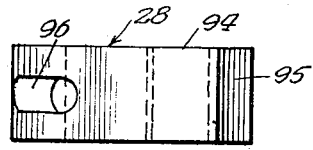
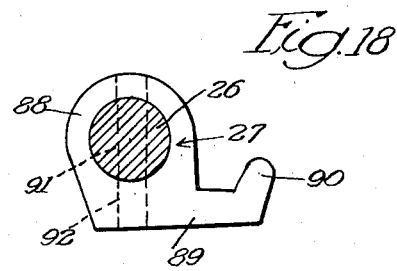
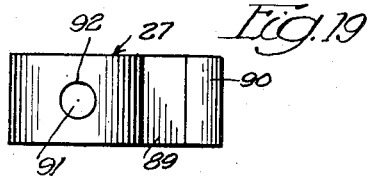
Inventor
LEROY H KNIBB
By Fred Gerlach Atty.

United States Patent Office 2,845,658
Patented Aug. 5, 1958

2,845,658

COLLAPSIBLE MANDREL FOR USE IN FABRICATING PLASTIC PIPE

Leroy H. Knibb, Chicago, Ill.

Application January 28, 1954, Serial No. 406,664

8 Claims. (Cl. 18—45)

The present invention relates generally to collapsible mandrels. More particularly the invention relates to that type of mandrel which is designed to be mounted on an arbor, serves as a form in connection with the fabrication or formation of a pipe of Fiberglas or like "plastic" material which tends to shrink or contract during curing thereof, comprises a series of complemental hinged segments together with means for locking the end segments together, and is adapted after formation of the pipe, removal of the arbor from the interior of the segments and release of the locking means to be collapsed into a contracted position in order that it may be readily removed from the formed pipe.

One object of the invention is to provide a collapsible mandrel which is an improvement upon, and has certain advantages over, previously designed mandrels of the aforementioned type and is characterized by high efficiency, simplicity of design and facility of manipulation.

Another object of the invention is to provide a collapsible mandrel in which the complemental segments are hinged together in a novel manner and the locking means are in the form of a plurality of spaced apart hooks which are mounted on a rock shaft on one of the segments, are adapted when the rock shaft is turned or rocked in one direction to engage rods on the other end segment and are further adapted when the shaft is turned or rocked in the other direction to become disengaged from the rods so as to permit of ready collapse of the mandrel after a pipe forming operation.

Another object of the invention is the provision in a collapsible mandrel of the type under consideration of novel means for positively collapsing the segments into their contracted position after removal of the arbor and release of the hooks constituting the locking means.

Another object of the invention is to provide a collapsible mandrel of the type and character under consideration in which the means for positively collapsing the segments into their contracted position embody a plurality of hooks which are mounted on the rock shaft and are adapted when such shaft is turned or rocked so as to effect release of the hooks constituting the releasable locking means to engage the rods and move the latter inwards.

Another object of the invention is to provide a collapsible mandrel in which the complemental hinged segments are provided with inwardly extending shoe-equipped lugs which serve to space the segments from the arbor and also center the mandrel as a whole with respect to the arbor.

A further object of the invention is to provide a collapsible mandrel which is so formed and constructed that it may be interposed between, and connected to, similar mandrels when it is desired to produce an extremely long or a continuous Fiberglas pipe.

A still further object of the invention is to provide a collapsible mandrel which is generally of new and improved construction and effectively and efficiently fulfills or accomplishes its intended purpose.

Other objects of the invention and the various advantages and characteristics of the present mandrel will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side view of a collapsible mandrel embodying the invention, certain parts being broken away and other parts being shown in section for purposes of illustration;

Figure 2 is a fragmentary inner side view of one of the intermediate segments;

Figure 3 is an end view of the segment that is shown in Figure 2;

Figure 4 is a fragmentary inner side view of the end segment that carries the rock shaft;

Figure 5 is an end view of the segment that is shown in Figure 4;

Figure 6 is a fragmentary inner side view of the end segment that carries the rods which are engaged by, and coact with, the hooks constituting the releasable locking means and the hooks constituting the means for positively collpasing the segments after removal of the arbor from the interior of the segments following formation of a pipe;

Figure 7 is an end view of the segment that is shown in Figure 6;

Figure 8 is a fragmentary inner side view of the other intermediate segment;

Figure 9 is an end view of the segment that is shown in Figure 8;

Figure 10 is an enlarged end view showing the segments of the mandrel in their open position as a preliminary to being mounted around the arbor;

Figure 11 is an end view showing the segments after they have been mounted around the mandrel but before the end segments are locked together by the locking hooks;

Figure 12 is a fragmentary vertical transverse section taken on the line 12—12 of Figure 11 and illustrating in detail the manner in which the rods which coact with the locking hooks and the collapsing hooks are mounted;

Figure 13 is a fragmentary vertical transverse section showing the locking hooks after they have been swung by the rock shaft into their operative position wherein they serve to lock the segments in series form around the arbor;

Figure 14 is a fragmentary vertical transverse section like Figure 13 except that it shows the mandrel removed as a preliminary to collapsing of the segments by the collapsing hooks;

Figure 15 is an enlarged end view showing the segments after being collapsed into their contracted position;

Figure 16 is a side view of one of the collapsing hooks, certain parts being broken away and other parts being shown in section for purposes of illustration;

Figure 17 is a top view of the collapsing hook that is shown in Figure 16;

Figure 18 is a side view of one of the locking hooks; and

Figure 19 is a top elevation or plan view of the locking hook that is shown in Figure 18.

The mandrel that is shown in the drawings constitutes the preferred form or embodiment of the invention. It is adapted to be mounted on a cylindrical arbor 20 and serves as a form on which a pipe of fiberglass or like "plastic" material may be fabricated or formed. It is contemplated that when the mandrel is in its operative position on the arbor strands of fiberglass impregnated or saturated with a curable liquid bonding medium will be wrapped around the mandrel until a pipe having the desired wall thickness is formed. After the wrapping operation the pipe while on the mandrel is air or heat cured in order to render it rigid or hard. Because the pipe in connection with the curing operation tends to shrink or contract, the mandrel is so formed that after removal of the arbor it may be collapsed in order to free it from the formed pipe. As its principal components the mandrel comprises a series of complemental hinged segments 21, 22, 23 and 24, a pair of rods 25 on the segment 24, a rock shaft 26 on the segment 21, a pair of locking hooks 27 on the rock shaft, and a pair of collapsing hooks 28 on the rock shaft.

The segment 21 is preferably in the form of an aluminum casting and comprises a comparatively long transversely curved wall 29, the outer surface of which is smooth. As shown in the drawings the wall 29 extends throughout an arc of approximately 120°. On the inner surface of the wall 29 are inwardly extending lugs 30. The latter are preferably three in number and are located substantially midway between the side edges of the wall 29. One of the lugs is located midway between the end edges of the wall 29 and the other lugs are located midway between the one lug and the end edges of the wall 29. The root ends of the lugs 30 are formed integrally with the wall 29 and the free ends of the lugs are provided with shoes 31. The latter are removably secured in place by way of screws 32 and have concave outer surfaces which are adapted to fit against, and are shaped conformably to, the arbor 20. The purpose of the shoe-equipped lugs 30 is to space the segment 21 from the arbor and also maintain the curved wall 29 in concentric relation with the arbor. Preferably the shoes 31 are formed of Phosphor bronze and have the concave surfaces thereof machined. At each end portion of the inner surface of the wall 29 are a pair of spaced apart inwardly extending lugs 33 and three spaced apart lugs 34. The lugs 33 are located directly inwards of one side edge of the wall 29. They have coaxial circular holes 35 therein and are formed integrally with the wall 29. The inwardly extending lugs 34 are located directly inwards of the other side edge of the wall 29. They are formed as integral parts of such wall and have coaxial circular holes 36 formed in them. The curved wall 29 of the segment 21 is reinforced by longitudinally extending webs 37 and transversely extending webs 38. Such webs are formed integrally with the wall 29 and project inwards from the inner surface of such wall.

The segment 22 is preferably in the form of an aluminum casting and comprises a comparatively long transversely curved wall 39. The latter has a smooth outer surface and is the same in length as the wall 29 of the segment 21. As shown in the drawings, the wall 39 extends throughout an arc of approximately 105°. On the inner surface of the wall 39 are three inwardly extending lugs 40 and these are located substantially midway between the side edges of the wall 39. One of the lugs 40 is located midway between the end edges of the wall 39 and the other lugs are located midway between the one lug and the end edges of the wall 39. The root ends of the lugs 40 are formed integrally with the wall 39 and the free ends of the lugs are provided with shoes 41. The latter are removably secured in place by screws 42 and have concave outer surfaces which are adapted to fit against, and are shaped conformly to, the cylindrical arbor 20. The purpose of the shoe-equipped lugs 40 is to space the segment 22 from the arbor and also maintain the transversely curved wall 39 in concentric relation with the arbor. The shoes 41, like the shoes 31 on the inwardly extending lugs 30 of the segment 21, are formed of Phosphor bronze and have the concave surfaces thereof machined. At each end portion of the inner surface of the wall 39 are a pair of spaced apart inwardly extending lugs 43 and a pair of spaced apart inwardly extending lugs 44. The lugs 43 are located directly inwards of one side edge of the wall 39. They have coaxial circular holes 45 and are formed integrally with the wall 39. The inwardly extending lugs 44 are located directly inwards of the other side edge of the wall 39. They are formed as integral parts of such wall and have coaxial circular holes 46 formed in them. The transversely curved wall 39 of the segment 22 is reenforced by longitudinally extending webs 47 and transversely extending webs 48. Such webs are formed integrally with the wall 39 and project inwards from the inner surface of such wall. The segment 22 is positioned next to the segment 21 and is hinged thereto by way of a pair of links 49, a pair of pins 50 and a pair of pins 51. The lugs 43 of the segment 22 are positioned in transverse alignment with the intermediate and inner lugs 34 of the segment 21. Certain ends of the links 49 are disposed between the intermediate and inner lugs 34 of the segment 21 and have holes 52 in coaxial relation with the holes 36. The pivot pins 50 extend through the holes 36 in the intermediate and inner lugs 34 of the segment 21 and also through the holes 52 in the links 49 and are secured against axial displacement by way of set screws 53 in said intermediate and inner lugs 34. The other ends of the links 49 are disposed between the lugs 43 of the segment 22 and have holes 54 in alignment with the holes 45. The pivot pins 51 extend through the holes 45 and the holes 54 in the links 49 and are secured against axial displacement by way of set screws 55 in the lugs 43. The links 49 permit the segment 21 to move or swing inwards or outwards with respect to the segment 22. When the mandrel is in its locked position as hereinafter described, the outer surface of the transversely curved wall 39 of the segment 22 forms, in effect, a continuation of the outer surface of the transversely curved wall 29 of the segment 21. The adjoining side edges of the segments 21 and 22 are curved or beveled in a complemental manner in order that they abut against one another when the mandrel is in its locked position while at the same time they permit the segment 21 to move inwards or outwards relatively to the segment 22.

The segment 23 is in the form of an aluminum casting and comprises a comparatively long transversely curved wall 56, the outer surface of which is smooth. As shown in the drawings, the wall 56 extends throughout an arc of approximately 105°. The wall 56 is the same in length as the transversely curved walls 29 and 39 of the segments 21 and 22. On the inner surface of the wall 56 are three inwardly extending lugs 57. The latter are located midway between the side edges of the wall 56. One of the lugs 57 is located midway between the end edges of the wall 56 and the other lugs are located midway between the one lug and the end edges of the wall 56. The root ends of the lugs 57 are formed integrally with the wall 56 and the free ends of the lugs are provided with shoes 58. The latter are removably secured in place by screws 59 and have concave outer surfaces which are adapted to fit against, and are shaped conformably to, the arbor 20. The shoe-equipped lugs 57 serve to space the segment 23 from the arbor and also to maintain the transversely curved wall 56 in concentric relation with the arbor. The shoes 58, like the shoes 31 and 41, are formed of Phosphor bronze and have the concave surfaces thereof machined. At each end portion of the inner surface of the wall 56 are three spaced apart lugs 60 and a pair of spaced apart lugs 61. The lugs 60 are located directly inwards of one side edge of the wall 56. They have coaxial circular holes 62 therein and are formed integrally with the wall 56. The inwardly extending lugs 61 are located adjacent and project slightly beyond the other end edge of the wall 56. They are formed as integral parts of the wall 56 and have coaxial circular holes 63 formed in them. The transversely curved wall 56 of the segment 23 is reenforced by longitudinally extending webs 64 and transversely extending webs 65. Such webs are formed integrally with the wall 56 and project inwards from the inner surface of such wall. The segment 23 is positioned or located next to the segment 22 and is hinged to the latter by way of a pair of links 66, a pair of pins 67 and a pair of pins 68. Certain ends of the links 66 are disposed between the inwardly extending lugs 44 and have transverse circular holes 69 in coaxial relation with the holes 46 in the lugs 44. The pins 67 extend through the holes 46 in the lugs 44 and the holes 69 in the links 66 and are secured against axial displacement by way of set screws 70 in the outer end portions of the lugs 44. The other ends of the links 66 are disposed between the intermediate and inner lugs 62 of the segment 23 and have circular holes 71 in alignment or coaxial relation with the holes 62 in the intermediate and inner lugs 60. The pins 68 extend through the holes 62 in the intermediate and inner lugs 60 and the holes 71 in the links 66 and are secured against axial displacement by way of set screws 72 in the outer end portions of the intermediate and inner lugs 62 of the segment 23. The links 66 permit the segments 22 and 23 to move inwards and outwards relatively to one another. When the mandrel is in its locked position the outer surface of the wall 56 forms a continuation of the outer surface of the wall 39 of the segment 22. The adjoining side edges of the walls 39 and 56 of the segments 22 and 23 are beveled or curved in a complemental fashion so that they abut against one another when the mandrel is in its locked position and at the same time permit the segment 23 to swing inwards or outwards with respect to the segment 22.

The segment 24 is in the form of an aluminum casting and comprises a comparatively long transversely curved wall 73, the outer surface of which is smooth. As shown in the drawings the wall 73 extends through an arc of approximately 30°. On the inner surface of the wall 29 are three inwardly extending lugs 74 and these are located midway between the side edges of the wall 73. One lug is located midway between the end edges of the wall 73 and the other lugs are located midway between the one lug and the end edges of the wall 73. The root ends of the lugs 74 are formed integrally with the wall 73 and the free ends of the lugs are provided with shoes 75 which are removably secured in place by way of screws 76 and have concave outer surfaces for engagement with the arbor 20. The shoe-equipped lugs 74 serve to space the segment 24 from the arbor and also to maintain the wall 73 in concentric relation with the arbor. The shoes 75 are the same as the shoes on the inwardly extending lugs 30, 40 and 57 of the segments 21, 22 and 23. At each end portion of the inner surface of the wall 73 are three spaced apart inwardly extending lugs 77. The latter are elongated transversely of the wall 73 and are of such length that the ends thereof project beyond the side edges of the wall 73. Certain ends of the lugs 77 have coaxial circular holes 78 and the other ends of the lugs have coaxial circular holes 79. The segment 24 of the mandrel is located next to the segment 23 and is hinged thereto by way of pins 80. The ends of the lugs 77 that have the holes 78 are disposed between the lugs 61 of the segment 23. The central portions of the pins 80 extend through the holes 78 in the lugs 77 and the ends of such pins are disposed in the holes 63 in the lugs 61. Set screws 81 in the outer end portions of the lugs 61 serve to hold the pins 80 against longitudinal or axial displacement. The pins 80 permit the segment 24 to swing inwards and back again relatively to the segment 23.

The transversely curved wall 73 of the segment 24 is reenforced by longitudinally extending webs 82 which are formed integrally with, and project inwards from, the inner surface of such wall.

The two rods 25 of the mandrel are located at the ends of the segment 24. They are positioned lengthwise of the transversely curved wall 73 and extend through the holes 79 in the inwardly extending lugs 77. Set screws 83 in the end portions of certain of the lugs 77 serve to hold the rods 25 against axial displacement relatively to the lugs. The portions of the rods that are disposed between the lugs 77 are designated by the reference numeral 84 and are positioned eccentrically with respect to the portions of the rods that are disposed in the holes 79. The outer ends of the rods are provided with kerfs 85 in order that the rods, upon loosening of the set screws 83, may be turned by a screw driver or similar tool. By turning the rods the eccentric portions 84 may be adjusted rotatively.

The rock shaft 26 is positioned lengthwise of the segment 21 and has the ends thereof journaled in the holes 35 in the inwardly extending lugs 33. Set screw equipped collars 86 are mounted on the rock shaft and such collars are positioned directly inwards of the inner lugs 33 and coact with the latter to hold the rock shaft against coaxial displacement while at the same time permitting it to be turned in one direction or the other. One end of the rock shaft is provided with a polygonal head 87 in order that the shaft may be manually rocked back and forth by way of a wrench or similar turning tool.

The locking hooks 27 of the mandrel are mounted on the end portions of the rock shaft 26 and consist of hub members 88, arm parts 89 and finger parts 90. The hub parts 88 of the locking hooks extend around the end portions of the rock shaft and are fixedly secured thereto by way of pins 91 which extend through diametric holes (not shown) in the rock shaft and registering holes 92 in opposite portions of the hub parts 81. The arm parts 89 of the locking hooks are connected to, and extend outwards from, the hub parts 88. The finger parts 90 are connected to the outer ends of the arm parts and extend at an obtuse angle relatively thereto. The locking hooks are positioned on the end portions of the rock shaft so that when the segments are positioned around the arbor 20 as shown in Figure 11, they are disposed adjacent the eccentric portions of the rods 25 that are between the intermediate and inner lugs 77 of the segment 24. The arm parts 89 of the locking hooks project in the direction of the rods 25 when the segments are mounted around the arbor, and the finger parts 90 are so arranged that they project outwards in the direction of the adjacent side portion of the transversely curved wall 29 of the segment 21. When the rock shaft 26 is turned in a counterclockwise direction as viewed in Figures 10, 11, 13, 14 and 15 the locking hooks swing outwards into a locked position wherein the finger parts 90 thereof are in hooked relation with the eccentric portions of the rods 25 that are between the intermediate and inner lugs 27 and when the rock shaft is turned in a clockwise direction as viewed in such figures of the drawings the locking hooks are swung inwards into an inoperative position wherein the finger parts 90 are disengaged from the aforementioned portions of the rods 25. It is contemplated that in connection with use of the mandrel the segments after being arranged in an open position as shown in Figure 10, will be mounted around the arbor 20 as shown in Figure 11. As soon as the segments are properly mounted around the arbor the rock shaft is turned in a counterclockwise direction as heretofore mentioned. Such turning on the part of the rock shaft causes the locking hooks to swing outwards into their operative positive wherein they serve to lock the end segments 21 and 24 together. The finger parts of the locking hooks are so arranged that when the hooks are in their operative or locked position they extend beyond the dead centers of the rock shaft 26 and the rods 25.

The two collapsing hooks 28 of the mandrel are mounted on the end portions of the rock shaft and are disposed outwards of the locking hooks 27. They are located opposite the eccentric portions of the rods 25 that are between the intermediate and outer lugs 77 of the segment 24, and consist of hub parts 93, arm parts 94 and finger parts 95. The hub parts 93 extend loosely around the rock shaft and are operatively connected thereto by way of lost motion connections in the form of slots 96 and pins 97. The slots 96 are formed in the hub parts 93 of the collapsing hooks and extend circumferentially with respect to the hub parts. The pins 97 are mounted fixedly in diametric holes 98 in the rock shaft and have certain ends thereof projecting into the slots 96, as best shown in Figure 16 of the drawings. The lost motion connections permit the rock shaft to be turned back and forth to a limited extent without imparting swinging motion to the collapsing hooks. However, when the pins of the lost motion connections strike the ends of the slots 96 in connection with turning of the rock shaft the collapsing hooks are caused to rotate with the shaft. The arm parts 94 of the collapsing hooks are connected to, and project outwards from, the hub parts 93 and are disposed outwards of the arm parts 89 of the locking hooks 27. The finger parts 95 are connected to the outer ends of the arm parts 94 and project inwards, i. e., towards the finger parts 90 of the locking hooks. When the segments 21, 22, 23 and 24 are in their locked position as shown in Figures 13 and 14 the arm and finger parts of the collapsing hooks 28 are, as shown in Figures 13 and 14, disposed outwards of the portions of the rods 25 that are between the intermediate and outer lugs 77 of the segment 24. When the rock shaft is initially turned in a clockwise direction as viewed in Figures 10, 11, 13, 14 and 15 and after removal of the arbor following a pipe fabricating operation the locking hooks swing inwards into their inoperative or released position and the collapsing hooks swing inwards into hooked relation with the portions of the rods 25 that are between the intermediate and outer lugs 77 of the segment 24. Further clockwise turning movement on the part of the rock shaft results in the collapsing hooks forcing the segment 24 inwards and towards the segment 21, thus resulting in collapsing of the segments as shown in Figure 15. The aforementioned lost motion connections are so arranged that the collapsing hooks are not swung inwards until after the locking hooks are completely disengaged from the portions of the rods 25 that are between the intermediate and inner lugs 77. The collapsing hooks 28 are provided with devices which cause them frictionally to grip the rock shaft 26. Such devices comprise balls 99 and springs 100. The balls 99 are disposed in the inner ends of radially extending screw threaded bores 101 in the hub parts 93 of the collapsing fingers 28 and are urged against the adjacent portions of the rock shaft by way of the springs 99. The latter are helical compression springs and are disposed in the central portions of the bores 101. The outer ends of the springs abut against kerf equipped screws 102 in the outer ends of the bores 101. When the locking hooks 27 are swung outwards into their locked position the aforementioned friction devices, irrespective of the lost motion connections in the form of slots 96 and pins 97, cause the collapsing hooks to swing outwards into their inoperative position.

In addition to the parts heretofore mentioned the mandrel comprises a pair of friction devices for yieldingly retaining the rock shaft in the various positions into which it is turned. Such devices comprise balls 103 and springs 104. The balls 103 are mounted in the inner ends of internally threaded bores 105 in the outer end portions of the outer lugs 33 and are urged into engagement with the adjacent portions of the rock shaft by the springs 104. The latter are helical compression springs and are located in the central portions of the bores 105. The outer ends of the springs 104 abut against kerf equipped screws 106 in the outer ends of the bores.

When it is desired to use the mandrel the segments 21, 22, 23 and 24 are first swung into an open or separated position as shown in Figure 10. Thereafter they are placed around the arbor 20 as shown in Figure 11. After positioning the segments around the arbor the rock shaft is turned so as to swing the locking hooks outwards into their operative position wherein they are in hooked relation with the portions of the rods 25 that are between the intermediate and inner lugs 77 of the segment 24 as heretofore mentioned. In connection with outward swinging of the locking hooks 27 the collapsing hooks 28 are caused to swing outwards into their inoperative position wherein the arm parts 94 thereof abut against the adjacent side portions of the transversely curved wall 31 of the segment 21. After the segments are locked around the arbor the mandrel is used as a form in the fabrication of a pipe of fiberglass or like material. After fabrication or formation of the pipe the arbor 20 is removed from the interior of the segments and then the segments are collapsed by turning the rock shaft so that it first swings the locking hooks 27 inwards into their unlocked position and then swings the collapsing hooks inwards. Such swinging movement on the part of the collapsing hooks causes the segment 24 first to move inwards and then to move towards the segment 21. At the conclusion of the segment collapsing operation the mandrel is in a contracted condition and hence may be readily removed from the formed pipe.

In order that the mandrel may be interposed between, and connected to, similar mandrels when it is desired to produce an extremely long or continuous pipe the ends of the walls 29, 39, 56 and 73 at one end of the mandrel are provided with arcuate pilot flanges 107 and the other ends of such walls have internal grooves 108 formed therein. The pilot flanges 107 are adapted to fit within the grooves in the adjoining end of a similar mandrel and the grooves 108 are adapted to receive the pilot flanges on the adjoining end of a similar mandrel. The pins 50 and 68 at one end of the mandrel are provided with extensions 109 which project beyond said one end of the mandrel. The pivot pins 50 and 68 at the other end of the mandrel terminate inwards of the outer lugs 34 and 60 and such lugs are provided with bushings 110 for receiving the pin extensions 109 of the adjoining similar mandrel. The end of the rock shaft 26 that is opposite the polygonal head 87 is provided with a polygonal socket 111 for receiving the polygonal head on the rock shaft of the adjoining similar mandrel. If it is desired in connection with formation or fabrication of a fiberglass pipe on the mandrel to drive the mandrel from the arbor the arbor is provided on the outer periphery thereof with a longitudinally extending key 112, the outer portion of which is adapted to fit within key-way forming notches 113 in the shoes 41 on the inwardly extending lugs 40 of the segment 22.

The herein described collapsible mandrel is essentially simple in design and, due to its particular construction, may be manipulated with facility. It effectively and efficiently fulfills its intended purpose and, as previously pointed out, is so designed and constructed that it may be interposed between, and connected to, similar mandrels when it is desired to produce an extremely long or continuous fiberglass pipe.

Whereas the segments of the mandrel have been defined as having transversely curved walls so that the mandrel is cylindrical when the segments are in their locked position it is to be understood that the walls of the segments may be differently shaped if it is desired, for example, to produce or form a pipe that is of polygonal cross section. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A collapsible mandrel adapted to be mounted temporarily on an elongated cylindrical arbor, designed to serve as a form on which to fabricate a pipe of "plastic" material and comprising a series of side by side complemental segments having hinges between them, adapted to be placed serially around the mandrel and each embodying an elongated wall and rigid lugs connected to, and extending inwards from, the wall, having concave inner end surfaces for snugly engaging the arbor, and adapted to hold the wall in spaced relation with the arbor, and coacting locking elements mounted respectively on the end segments of the series, and inwards of the walls thereof, adapted after the segments are placed serially around the arbor to be manipulated into a locked position in order to lock the segments in place, and further adapted upon removal of the arbor after a pipe fabricating operation to be manipulated into an unlocked position in order to permit the segments to be collapsed as a preliminary to removal from the pipe.

2. A collapsible mandrel adapted to be mounted temporarily on an elongated cylindrical arbor, designed to serve as a form on which to fabricate a pipe of "plastic" material and comprising a series of side by side complemental segments having hinges between them, adapted to be positioned serially around the mandrel and each embodying an elongated wall and rigid lugs connected to, and extending inwards from, the wall, having concave inner end surfaces for snugly engaging the arbor, and adapted to hold the wall in spaced relation with the arbor, releasable locking means inwards of the walls of the segments for securing the segments in place after they are positioned serially around the arbor, and means inwards of said walls of the segments for positively collapsing the segments into a contracted position after removal of the arbor from the interior of the segments at the conclusion of a pipe fabricating operation and also after release of said locking means.

3. A collapsible mandrel adapted to be mounted temporarily on an elongated rigid arbor, designed to serve as a form on which to fabricate a pipe of "plastic" material and comprising a series of side by side complemental segments having hinges between them, adapted to be positioned serially around the mandrel and each embodying an elongated wall and inwardly extending lugs for holding the wall in spaced relation with the arbor, releasable locking means for securing the segments in place after they are positioned serially around the arbor, and means for positively collapsing the segments into a contracted position after removal of the arbor from the interior of the segments at the conclusion of a pipe fabricating operation and also after release of said locking means, said collapsing means comprising a rod mounted on one of the end segments of the series so that it is disposed lengthwise and inwards of the wall of the one end segment, a rock shaft mounted on the other end segment of the series so that it is disposed lengthwise and inwards of the wall of the other end segment, and a radially extending hook mounted on the rock shaft and adapted when the rock shaft is turned in one direction to swing inwards into hooked relation with the rod and cause the rod together with the one end segment to swing inwards and toward the other end segment and when the shaft is turned in the other direction to swing outwards out of hooked relation with the rod.

4. A collapsible mandrel adapted to be mounted temporarily on an elongated rigid arbor, designed to serve as a form on which to fabricate a pipe of "plastic" material and comprising a series of side by side complemental segments having hinges between them, adapted to be positioned serially around the mandrel and each embodying an elongated wall and inwardly extending lugs for holding the wall in spaced relation with the arbor, releasable locking means for securing the segments in place after they are positioned serially around the arbor, and means for positively collapsing the segments into a contracted position after removal of the arbor from the interior of the segments at the conclusion of a pipe fabricating operation and also after release of said locking means, said locking means comprising a rod mounted on one of the end segments of the series so that it is disposed lengthwise and inwards of the wall of the one end segment, a rock shaft mounted on the other end segment of the series so that it is disposed lengthwise and inwards of the wall of the other end segment, and a radially extending hook mounted fixedly on the rock shaft and adapted when the shaft is turned in one direction to swing outwards into hooked relation with the rod and when the shaft is turned in the other direction to swing inwards out of hooked relation with the rod, said collapsing means including the rod and the rock shaft and embodying a radially extending hook formed separately from, and independent of, the first mentioned hook, mounted on the rock shaft, and adapted when the rock shaft is turned in said other direction to swing inwards into hooked relation with the rod and cause the rod together with the one end segment to move inwards and towards said other end segment and when the shaft is turned in said one direction to swing outwards out of hooked relation with the rod.

5. A collapsible mandrel adapted to be mounted temporarily on an elongated rigid arbor, designed to serve as a form on which to fabricate a pipe of "plastic" material and comprising a series of side by side complemental segments having hinges between them, adapted to be positioned serially around the mandrel and each embodying an elongated wall and inwardly extending lugs for holding the wall in spaced relation with the arbor, releasable locking means for securing the segments in place after they are positioned serially around the arbor, and means for positively collapsing the segments into a contracted position after removal of the arbor from the interior of the segments at the conclusion of a pipe fabricating operation and also after release of said locking means, said locking means comprising a rod mounted on one of the end segments of the series so that it is disposed lengthwise and inwards of the wall of the one end segment, a rock shaft mounted on the other end segment of the series so that it is disposed lengthwise and inwards of the wall of the other end segment, and a radially extending hook mounted fixedly on the rock shaft and adapted when the shaft is turned in one direction to swing outwards into hooked relation with the rod and when the shaft is turned in the other direction to swing inwards out of hooked relation with the rod, said collapsing means including the rod and rock shaft and embodying a hook formed separately from, and independent of, the first mentioned hook, mounted loosely on, projecting radially from the rock shaft, having a lost motion driving connection between it and said rock shaft, and adapted when the rock shaft is turned in said other direction to swing inwards into hooked relation with the rod and to cause the rod together with the one end segment to move inwards and towards the other end segment and when the shaft is turned in said one direction to swing outwards out of hooked relation with the rod.

6. A collapsible mandrel adapted to be mounted temporarily on an elongated rigid arbor, designed to serve as a form on which to fabricate a pipe of "plastic" material and comprising a series of side by side complemental segments having hinges between them, adapted to be positioned serially around the mandrel and each embodying an elongated wall and inwardly extending lugs for holding the wall in spaced relation with the arbor, releasable locking means for securing the segments in place after they are positioned serially around the arbor, and means for positively collapsing the segments into a contracted position after removal of the arbor from the interior of the segments at the conclusion of a pipe fabricating operation and also after release of said locking means, said locking means comprising a rod mounted on one of the end segments of the series so that it is disposed lengthwise and inwards of the wall of the one end segment, a rock shaft mounted on the other end segment of the series so that it is disposed lengthwise and inwards of the wall of the other end segment, and a radially extending hook mounted fixedly on the rock shaft and adapted when the shaft is turned in one direction to swing outwards into hooked relation with the rod and when the shaft is turned in the other direction to swing inwards out of hooked relation with the rod, said collapsing means including the rod and rock shaft and embodying a hook formed separately from, and independent of, the first mentioned hook, mounted loosely on and, projecting radially from, the rock shaft, having a lost motion driving connection between it and said rock shaft, adapted when the rock shaft is turned in said other direction to swing inwards into hooked relation with the rod and to cause the rod together with the one end segment to move inwards and towards the other end segment and when the shaft is turned in said one direction to swing outwards out of hooked relation with the rod, and provided with means for causing it frictionally to grip said rock shaft.

7. A collapsible mandrel adapted to be mounted temporarily on an elongated rigid arbor, designed to serve as a form on which to fabricate a pipe of "plastic" material and comprising a series of side by side complemental segments having hinges between them, adapted to be positioned serially around the mandrel and each embodying an elongated wall and inwardly extending lugs for holding the wall in spaced relation with the arbor, releasable locking means for securing the segments in place after they are positioned serially around the arbor, and means for positively collapsing the segments into a contracted position after removal of the arbor from the interior of the segments at the conclusion of a pipe fabricating operation and also after release of said locking means, said locking means comprising a pair of spaced apart coaxial rods mounted on one of the end segments of the series so that they extend lengthwise of the wall of the one end segment and are disposed inwards of the ends of such wall, a rock shaft mounted on the other end segment of the series so that it is disposed lengthwise and inwards of the wall of the other segment and extending substantially throughout the length of said last mentioned wall, and a pair of hooks mounted fixedly on, and projecting radially from, the ends of the rock shaft and adapted when the rock shaft is turned in one direction to swing outwards into hooked relation with the rods and when the shaft is turned in the opposite direction to swing inwards out of hooked relation with said rods, said collapsing means including the rods and the rock shaft and embodying a pair of hooks formed separately from, and independent of, the hooks of the locking means, mounted on, and projecting radially from, the ends of the rock shaft, located at the sides of the last mentioned hooks, and adapted when the rock shaft is turned in its said other direction to swing inwards into hooked relation with the rods and to cause the rods together with the one end segment to move inwards and towards said other end segment and when the rock shaft is turned in said one direction to swing outwards out of hooked relation with said rods.

8. An elongated collapsible mandrel adapted to be mounted temporarily in an elongated rigid arbor and also to be aligned with, and form a continuation of, a like similarly arranged mandrel, designed with said like mandrel to form a form on which to fabricate a pipe of "plastic" material and comprising a series of side by side complementary segments having hinges between them, adapted to be positioned serially around the mandrel and each embodying an elongated wall and inwardly extending lugs for holding the wall in spaced relation with the arbor, and releasable locking means for securing the segments in place after they are positioned serially around said arbor, said locking means embodying a rock shaft mounted on one of the end segments of the series so that it is disposed lengthwise and inwards of the wall of the one end segment extending substantially throughout the length of the last mentioned wall, and having on the end thereof that is remote from said like mandrel a polygonal head for turning purposes and on the end thereof that is adjacent the like mandrel a polygonal socket for connecting it to the head on the adjacent end of the rock shaft of said like mandrel.

References Cited in the file of this patent

UNITED STATES PATENTS

| | | |
|---|---|---|
| 314,387 | Lord | Mar. 24, 1885 |
| 811,310 | Maag | Jan. 30, 1906 |
| 823,141 | Shaw | June 12, 1906 |
| 910,578 | Ransome | Jan. 26, 1909 |
| 1,172,600 | Jagger | Feb. 22, 1916 |
| 1,676,325 | Doll | July 10, 1928 |
| 1,837,092 | Almquist | Dec. 15, 1931 |
| 2,456,513 | Johnson | Dec. 14, 1948 |

FOREIGN PATENTS

| | | |
|---|---|---|
| 385,495 | France | May 13, 1908 |
| 159,209 | Great Britain | Apr. 6, 1922 |
| 589,772 | France | June 2, 1925 |
| 677,172 | France | Dec. 7, 1929 |